March 19, 1957   C. D. CLAWSON   2,785,969
SEED PLANTING PACKAGE
Filed Nov. 13, 1953

INVENTOR.
CLINTON D. CLAWSON
BY
Oberlin & Limbach
ATTORNEYS.

United States Patent Office 2,785,969
Patented Mar. 19, 1957

2,785,969
SEED PLANTING PACKAGE

Clinton D. Clawson, Shaker Heights, Ohio, assignor to Ferro Corporation, Cleveland, Ohio, a corporation of Ohio Application November 13, 1953, Serial No. 391,869

4 Claims. (Cl. 71—64)

This invention is a continuation-in-part of my application Serial Number 313,542, filed October 7, 1952, and now abandoned.

This invention relates to seed planting and has more particular reference to a product for seed germination and promoting good plant growth.

Seeds which are scattered more or less haphazardly as by sowing, are subject to irregular and uneven distribution. In addition, seeds will be lost due to the washing effect of rain or blown away by winds. In many instances the emergence of seedlings are by soils which tend to crust over and by soils which are deficient in nutrients.

It is, therefore, a principal object of this invention to provide a seed planting package which will prevent seeds from washing or blowing away and which package will promote quick and efficient seed germination and subsequent vigorous plant growth.

Other objects will become apparent as the invention proceeds.

To the accomplishment of the foregoing and related ends, the invention, then, comprises the features hereinafter fully described and particularly pointed out in the claims, the following description and accompanying drawings setting forth in detail certain illustrative embodiments of the invention, these being indicative, however, of but a few of the various ways in which the principle of the invention may be employed.

Broadly stated the present invention comprises a preformed solid mass in which seeds may be embedded for germination and subsequent plant growth comprising:

(a) A minor amount by volume of a slowly water soluble fused synthetic vitreous matrix containing in combined form all of the elements, in addition to nitrogen, and including the minor elements necessary to and in such form as to support vigorous plant growth;

(b) A minor amount by volume of a slowly soluble material which will supply the nitrogen necessary for vigorous plant growth;

(c) A major amount by volume of a water retaining carrier; and (d) A water soluble binder for the mass; said mass characterized further in that water in which said mass has been slurried at about room temperature for about one hour has a pH in the range of 6 to 7.

Figure 1:
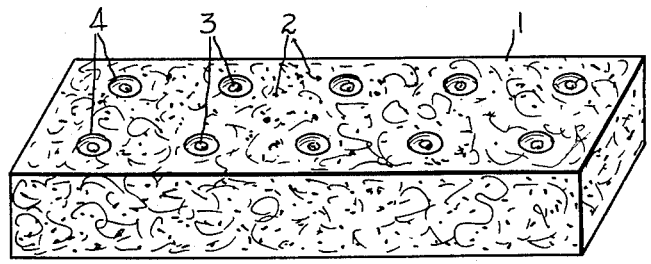
Fig. 1 is a perspective view of a fabricated seed planting package.
Figure 2:
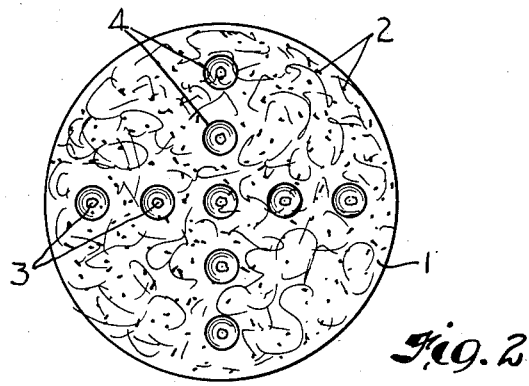
Fig. 2 is a top plan view of another embodiment of the seed planting package.

In order to facilitate the understanding of the present invention it will be assumed that the seeds are arranged in a rectangular bar in parallel longitudinal rows. It is to be noted that the seed planting package may be square, round, oblong or any desired geometric design and the seeds may be arranged in any pattern to suit the fancy of the user.

Referring more specifically to the drawings the present invention consists of several portions, to wit: carrier 1 is a water retaining medium, such as, fired shale (Haydite), exfoliated mica (vermiculite), pumice and wood pulp chips. In the preferred embodiment of my invention I use the exfoliated mica. The carrier 1 is formed into a bar and held together by a binder. Such materials as gelatin, methylated cellulose, agar, peat moss and paper may be used as the binder. Plant foods 2 are intimately mixed in the desired quantity with the carrier and binder. The ingredients are mixed in a water slurry and formed by extruding or molding. The thus formed package has indentations or grooves 4 along one surface so that seeds 3 may be placed therein. Seeds 3 are held in place in indentations 4 by being covered over with some of the same composition of which the package is made.

I have found that a seed planting package with a pH of 6-7 is necessary to obtain optimum germination and subsequent vigorous plant growth. In other words, what is meant is that if the package is slurried in water (about 2 parts water to one part of seed planting package) at room temperature for about an hour, the water from the slurry has a pH in the range of 6-7. One of the unique features of the present invention is the incorporation of a very slowly soluble fertilizing material. Since this material has a pH of about 9.5 to 10.5 I use a material such as peat moss which has a pH of 4.5 to 5.5 as part of the binder and thus obtain a finished product which when slurried in water has a pH in the range of 6-7.

The above mentioned fertilizer material comprises a synthetic vitreous material consisting of a glassy matrix having in combined form the elements essential to proper plant growth. The following formulae are illustrative of the glassy fertilizer material used in the present invention:

A

| | Percent |
|---|---|
| $Fe_2O_3$ | 10.0 |
| $MnO_2$ | 4.0 |
| $CuO$ | 4.0 |
| $ZnO$ | 4.0 |
| $B_2O_3$ | 2.0 |
| $MoO_3$ | 0.2 |
| $SiO_2$ | 58.0 |
| $CaO$ | 2.0 |
| $MgO$ | 1.5 |
| $K_2O$ | 8.0 |
| $Na_2O$ | 5.0 |
| $CoO$ | 0.0 |

B

| | Percent |
|---|---|
| $Fe_2O_3$ | 3.5 |
| $MnO_2$ | 0.1 |
| $CuO$ | 0.04 |
| $ZnO$ | 0.05 |
| $B_2O_3$ | 0.15 |
| $MoO_3$ | 0.006 |
| $SiO_2$ | 37.10 |
| $CaO$ | 18.00 |
| $MgO$ | 1.6 |
| $K_2O$ | 21.10 |
| $Na_2O$ | 0.0 |
| $CoO$ | 0.003 |

The ingredients comprising the above shown glassy fertilizer may vary in a range as follows:

| | Percent |
|---|---|
| $Fe_2O_3$ | 2 to 20 |
| $MnO_2$ | 0.1 to 10 |
| $CuO$ | 0.04 to 8 |
| $ZnO$ | 0.05 to 8 |
| $B_2O_3$ | 0.15 to 5 |
| $MoO_3$ | 0.001 to 2 |
| $SiO_2$ | 25 to 75 |
| $CaO$ | 1 to 20 |
| $MgO$ | 1 to 5 |
| $K_2O$ | 1 to 25 |
| $Na_2O$ | 0 to 25 |
| $P_2O_3$ | 0 to 25 |
| $CoO$ | 0 to 1 |

In the manufacture of the above disclosed synthetic vitreous fertilizer the raw ingredients are placed in a smelter and heated to a molten mass. The molten mass is then fritted in water. For some reason, as yet unknown, it is necessary to frit the molten material in water in order for the material to effectively supply nutrients to growing plants.

These fertilizer materials have a relatively slow solubility in water and therefore do not leach out and become unavailable to the plants through chemical reaction with the soil. The material is non-toxic in high concentrations so that large amounts can be applied at once to furnish an ample supply of nutrients over a long period of time. In spite of the extremely low solubility of the fertilizing material used in the present invention the rate of release of the nutrients is such that germination and subsequent plant growth is far superior to seeds planted without the fertilizing material.

From the foregoing compositions it will be seen that all the major elements necessary to plant growth are present except nitrogen. Since the fertilizer material is manufactured at high temperatures it is impossible to include nitrogen in the synthetic vitreous matrix. However, after the molten vitreous mass is fritted in water and dried I admix a slowly soluble source of nitrogen, such as urea formaldehyde with the vitreous fertilizer material and thus obtain a fertilizer material containing all of the elements necessary for plant growth. I use the nitrogen source in the amount of about 3% to 50% of the weight of the vitreous fertilizer material used.

An example of the seed planting package of the present invention is as follows:

8 lbs. paper
12.5 lbs. peat moss
10 lbs. fertilizer material (example b above)
5.6 cu. ft. water
91.4 lbs. exfoliated mica
2 lbs. urea formaldehyde (source of nitrogen)

Bars were molded from this composition, dried and seeds placed in indentations along the surface of the bars.

A bar from the aforegoing composition was planted in a clay soil. Alongside the bar the same number of seeds were planted in the soil as a control. Six days after the planting the seeds in the bar began to sprout and show through the broken crust of the soil, none of the control seeds showed germination. Ten days after planting all six seeds in the bar were vigorous and upright while those of the control showed 1 good germination, 2 very retarded, 1 snapped in half trying to push its way out of the soil and 2 seeds failed to germinate at all.

While the range of ingredients comprising the seed planting package of the present may vary widely, I have found the preferred range of composition to be as follows:

| | Percent |
|---|---|
| Water retaining carrier | 50–90 |
| Binder | 10–60 |
| Synthetic vitreous fertilizer | 1–15 |

It is important that the seed planting package whether in bar form or some other shape have reasonable strength to survive handling. It is also desirable to have a package which will soften when wetted so that the roots will have freedom of growth. Paper pulp is an excellent binder, however, paper pulp alone produces a dense package which is undesirable for root formation. In the preferred embodiment of my invention I use a mixture of about 40% paper pulp and 50% peat moss as the binder for the water retaining carrier. However, the amounts of paper pulp and peat moss can be varied to suit the user.

In operation, a slit trench or furrow is formed in the ground to a desired depth, the seed planting package is deposited therein, covered over with the soil and the area thoroughly watered. The water seeping through the covering layer of soil is quickly absorbed by the carrier and binder. The binder disintegrates rapidly and leaves the seeds surrounded by the fertilizer material and the carrier which acts as a mulch and prevents the seeds from being baked and dried out. Under these conditions the seeds germinate very rapidly and the presence of the fertilizer material in the immediate vicinity of the germinated seeds offers the new plant a greater opportunity to develop, especially in the early stages of its growth.

Figure 3:
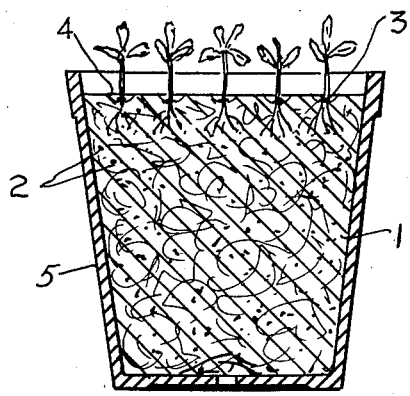
Fig. 3 is a cross sectional view of a flower pot containing the present invention.

It is within the contemplation of the present invention to use the seed planting package as a "soilers" soil for growing plants in flower pots. Referring to Fig. 3 the seed planting package is molded in the shape of a flower pot and placed into a pot. When the flower pot is watered the carrier retains the moisture and the fertilizer intimately dispersed therein supplies the necessary food both as to major and minor elements necessary for proper plant growth.

No special kinds of seeds are required for use in the present invention. They may be any common type which are ordinarily used to grow vegetables, flowers, or trees. If desired or deemed necessary any of the well known insecticides may be incorporated in the seed package of the present invention.

From the foregoing it will readily be seen that the seed planting package of the present invention is a superior means of germinating seeds and supporting growth. Other modes of applying the principle of the invention may be employed, change being made as regards the details described, provided the features stated in any of the following claims or the equivalent of such be employed.

I therefore, particularly point out and distinctly claim as my invention:

1. As a new product, a preformed solid mass in which seeds may be embedded for germination and subsequent plant growth comprising a substantially uniform admixture of: (a) from about 1% to 15% by volume of a slowly water soluble fused synthetic vitreous matrix containing in combined form all of the necessary fertilizer elements, other than nitrogen, and including the minor elements necessary to and in such form as to support vigorous plant growth; (b) from about 3% to 50% of the weight of component (a) of a slowly soluble material which will supply the nitrogen necessary for vigorous plant growth; (c) from about 50% to 90% of a water retaining carrier; and (d) from about 10% to 60% of a water soluble binder for the mass; said mass characterized further in that water in which said mass has been slurried at about room temperature for about one hour has a pH in the range of 6 to 7.

2. A product, as in claim 1 in which the source of nitrogen is urea formaldehyde.

3. A product, as in claim 1 in which the water retaining carrier is exfoliated mica.

4. A product, as in claim 1 in which the binder comprises a mixture of paper pulp and peat moss.

(References on following page)

References Cited in the file of this patent

UNITED STATES PATENTS

| | | |
|---|---|---|
| 959,841 | Carpenter | May 31, 1910 |
| 2,113,523 | White | Apr. 5, 1938 |
| 2,117,808 | Jones | May 17, 1938 |
| 2,129,334 | Northen | Sept. 6, 1938 |
| 2,143,468 | Avery | Jan. 10, 1939 |
| 2,192,939 | Slayter | Mar. 12, 1940 |
| 2,732,290 | Vana | Jan. 24, 1956 |

FOREIGN PATENTS

| | | |
|---|---|---|
| 419,422 | Canada | Apr. 4, 1944 |
| 641,280 | Great Britain | Aug. 9, 1950 |
| 657,693 | Great Britain | Sept. 26, 1951 |

OTHER REFERENCES

Industrial and Engineering Chemistry, vol. 43, No. 3, page 17A (March 1951), article "Frit for Flowers."